Patented May 6, 1941

2,241,234

UNITED STATES PATENT OFFICE 2,241,234

POLYVINYL ACETAL RESIN

Gustave Bryant Bachman, Rochester, N. Y., assignor to Eastman Kodak Company, Rochester, N. Y., a corporation of New Jersey No Drawing. Application March 15, 1939, Serial No. 262,057. In Great Britain March 22, 1938

6 Claims. (Cl. 260—73)

This invention relates to polyvinyl acetal resins and more particularly to polyvinyl acetal resins of particular utility in the manufacture of cinematographic film.

Simple polyvinyl acetal resins (i. e. those in which the acetal linkages are formed from but one kind of acetal group) have been prepared from polyvinyl alcohols by condensation of aldehydes therewith, in the presence of an acetal condensation catalyst. Simple polyvinyl acetal resins have also been prepared by concomitantly deesterifying a polyvinyl ester and condensing the deesterified product with an aldehyde, in the presence of a deesterification catalyst, the deesterification catalyst serving also to accelerate the condensation of the deesterified product with the aldehyde.

The polyvinyl acetal resins prepared from acetaldehyde are probably the most interesting of the polyvinyl acetal resins in which the acetal linkages are formed from but a single saturated aliphatic aldehyde. These polyvinyl acetaldehyde acetal resins appeared to be useful for a variety of purposes in the plastic field. For example, such resins can be cast from ordinary simple solutions into the form of transparent film or sheet of fairly low thermoplasticity. However, the film or sheet is too brittle to be adapted commercially to certain uses; for instance, the film or sheet is too brittle to serve as a support for light-sensitive photographic coatings in the manufacture of cinematographic film. Efforts to decrease the brittleness of such resins by changing the chemical composition thereof, viz. by increasing the hydroxyl group content, have resulted in resins which are too water-susceptible to be employed commercially in the manufacture of cinematographic film.

Film or sheet made from polyvinyl butyraldehyde acetal resins is fairly resistant to moisture, but is too thermoplastic to be employed in the manufacture of cinematographic film.

It is also known that polyvinyl acetaldehyde acetal resins can be improved by introducing butyraldehyde acetal groups into the resin so that from about 20 to about 40 mol. per cent of the total acetal groups in the resin are butyraldehyde acetal groups, while the remainder are acetaldehyde acetal groups. Film or sheet made from such butyraldehyde-acetaldehyde acetal resins is of lower moisture susceptibility than film or sheet made from polyvinyl acetaldehyde acetal resins and of lower thermoplasticity than film or sheet made from polyvinyl butyraldehyde acetal resins.

I have now found that polyvinyl acetaldehyde acetal resins can be further improved, particularly as to tensile strength, by introducing both saturated aliphatic aldehyde acetal groups containing from 3 to 7 carbon atoms and benzaldehyde acetal groups into the resin, so that a portion of the acetal groups is benzaldehyde acetal groups and another portion is saturated aliphatic aldehyde acetal groups (containing from 3 to 7 carbon atoms), while the remainder is acetaldehyde acetal groups. Film or sheet made from my new resins has low moisture susceptibility, while at the same time possessing a fairly low thermoplasticity and good tensile strength. Such film or sheet is particularly suited as a support for light-sensitive photographic coatings.

I have further found that polyvinyl formaldehyde acetal resins can be similarly improved. In fact, I have found that polyvinyl acetal resins in which a portion of the acetal groups is saturated aliphatic aldehyde acetal groups containing from 1 to 2 carbon atoms, another portion is saturated aliphatic aldehyde acetal groups containing from 3 to 7 carbon atoms and another portion is benzaldehyde acetal groups are considerably different from the known polyvinyl acetal resins.

It is therefore an object of my invention to provide new resins. A further object is to provide a process for preparing my new resins. A further object is to provide film or sheet of my new resins. Other objects will appear hereinafter.

According to my invention, I prepare my new resins by condensing a polyvinyl alcohol with a saturated aliphatic aldehyde containing from 1 to 2 carbon atoms and with a saturated aliphatic aldehyde containing from 3 to 7 carbon atoms and with a benzaldehyde, in the presence of an acetal condensation catalyst. More advantageously, I prepare my new resins by concomitantly deesterifying a polyvinyl ester and condensing the deesterified product with saturated aliphatic aldehydes containing from 1 to 2 carbon atoms and with saturated aliphatic aldehydes containing from 3 to 7 carbon atoms and with a benzaldehyde, in the presence of an acid deesterification catalyst.

Of the total aldehydes which I employ in preparing one of my new resins, at least 5 mol. percent should be at least one saturated aliphatic aldehyde containing from 1 to 2 carbon atoms, at least 5 mol. percent should be at least one saturated aliphatic aldehyde containing from 3 to 7 carbon atoms, and at least 5 mol. percent should be at least one benzaldehyde. More advantageously, at least 9 or 10 mol. percent of each of the aforesaid kinds of aldehydes are employed. A particularly useful group of resins from the standpoint of the manufacture of photographic film can be obtained by employing from about 30 to about 60 mol. percent of acetaldehyde, from about 9 or 10 to 15 mol. percent of a saturated aliphatic aldehyde containing from 3 to 7 carbon atoms and the remaining mol. percent of a benzaldehyde.

The total aldehyde employed is advantageously in excess of that actually needed to combine with all the hydroxyl groups in the polyvinyl alcohol or deesterified polyvinyl ester; excesses up to 100% are advantageously employed. The condensation of the total aldehydes with the polyvinyl alcohol or deesterified polyvinyl ester should be continued until the amount of hydroxyl groups remaining uncombined is equivalent to not more than about 25% by weight of polyvinyl alcohol based on the weight of the finished polyvinyl acetal resin. Advantageously, the amount of hydroxyl groups remaining uncombined is equivalent to not more than about 15% by weight of polyvinyl alcohol. In the case of employing a polyvinyl ester as a starting material, deesterification and condensation should be continued until the amount of ester groups remaining is equivalent to not more than about 20% by weight of polyvinyl ester based on the weight of the finished polyvinyl acetal resin. The amount of ester groups is advantageously still lower, e. g. 10% or preferably as low as 5 or even 2%, of polyvinyl ester.

As saturated aliphatic aldehydes containing from 1 to 2 carbon atoms, formaldehyde, and particularly acetaldehyde are useful in practicing my invention. As saturated aliphatic aldehydes containing from 3 to 7 carbon atoms, propionaldehyde, butyraldehyde, isobutyraldehyde, isovaleraldehyde and 2-ethylbutyraldehyde are exemplary. Butyraldehyde is particularly useful in practicing my invention, especially when employed in conjunction with acetaldehyde. As benzaldehydes, I include, of course, ordinary benzaldehyde, as well as halogenated or nitrated benzaldehydes, such as orthocholrobenzaldehyde and metanitrobenzaldehyde, for example.

The following examples will serve to illustrate the manner of preparing my new resins. These examples are not intended to limit my invention.

EXAMPLE 1.—*Polyvinyl acetaldehyde-butyraldehyde-benzaldehyde acetal resin*

172 g. (2 mol.) of polyvinyl acetate (viscosity 25) were dissolved in 632 cc. of 95% ethyl alcohol. To this solution were added 26.8 g. of sulfuric acid (sp. g. 1.84) and 10.6 g. (0.1 mol.) of benzaldehyde The resulting mixture was raised to a temperature of 70° C and maintained at that temperature for about two hours At the end of this time, 28.8 g. (0.4 mol.) of butyraldehyde and 70.4 g. (1.6 mol.) of paraldehyde were added to the reaction mixture and warming at 70° C. was continued for about six further hours. At the end of this time, the reaction mixture was diluted with about twice its volume of acetone. The diluted reaction mixture was then poured slowly into cold water to precipitate the resin. The precipitated resin was thoroughly washed with cold water and finally dried at from 140° to 160° F. The resin contained an acetate group content equivalent to about 9.7% by weight of polyvinyl acetate and a hydroxyl group content equivalent to about 6.9% by weight of polyvinyl alcohol. Of the total aldehydes employed (2.1 mol.) about 5 mol. percent (10.1 mol.) was benzaldehyde, about 21 mol. percent (0.4 mol.) was butyraldehyde and about 74 mol. percent (1.6 mol.) was acetaldehyde.

EXAMPLE 2.—*Polyvinyl acetaldehyde-butyraldehyde-benzaldehyde acetal resin*

917 g. (10.7 mol.) of polyvinyl acetate (viscosity 25) were dissolved in 2.27 kg. of 95% ethyl alcohol. To this solution were added 335 g. (3.16 mol.) of benzaldehyde, 64 g. (0.89 mol.) of butyraldehyde, 278 g. (6.3 mol.) of paraldehyde, and 227 g. of hydrochloric acid (sp. g. 1.18). The resulting mixture was allowed to stand at about 40° C. for about four days. At the end of this time, the reaction mixture was diluted with about twice its volume of a 1:1 (by volume) mixture of 95% ethyl alcohol and acetic acid. The diluted reaction mixture was then poured into cold water to precipitate the resin. The precipitated resin was thoroughly washed with water and then dried at 140° to 160° F. The resin had an acetate group content equivalent to about 2.2% by weight of polyvinyl acetate and a hydroxyl group content equivalent to about 9.9% by weight of polyvinyl alcohol. Of the total aldehydes in the reaction mixture (10.35 mol.), about 30 mol. percent (3.16 mol.) was benzaldehyde, about 9 mol. percent (0.89 mol.) was butyraldehyde, and about 61 mol. percent (6.3 mol.) was acetaldehyde.

EXAMPLE 3.—*Polyvinyl acetaldehyde-butyraldehyde-benzaldehyde acetal resin*

917 g. (10.7 mol.) of polyvinyl acetate (of viscosity 25) were dissolved in 2.27 kg. of 95% ethyl alcohol. To this solution were added 502 g. (4.73 mol.) of benzaldehyde, 64 g. (0.89 mol.) of butyraldehyde, 209 g. (4.75 mol.) of paraldehyde and 227 g. of hydrochloric acid (sp. g. 1.18). The resulting mixture was treated and the resin isolated as in Example 2. The resin contained an acetate group content equivalent to about 2.6% by weight of polyvinyl acetate and a hydroxyl group content equivalent to about 11.5% by weight of polyvinyl alcohol. Of the total aldehydes employed (10.37 mol.), about 45 mole percent (4.73 mol.) was benzaldehyde, about 9 mol. percent (0.89 mol.) was butyraldehyde and about 46 mol. per cent (4.75 mol.) was acetaldehyde.

EXAMPLE 4.—*Polyvinyl acetaldehyde-butyraldehyde-benzaldehyde acetal resin*

917 g. (10.7 mol.) of polyvinyl acetate (of viscosity 25) were dissolved in 2.27 kg. of 95% ethyl alcohol. To this solution were added 670 g. (6.32 mol.) of benzaldehyde, 64 g. (0.89 mol.) of butyraldehyde, 139 g. (3.16 mol.) of paraldehyde and 227 g. of hydrochloric acid (sp. g. 1.18). The resuting solution was treated and the resin isolated as in Example 2. The resin contained an acetate group content equivalent to about 3.3% by weight of polyvinyl acetate and a hydroxyl group content equivalent to about 13.0% by weight of polyvinyl alcohol. Of the total aldehydes employed (10.37 mol.), about 61 mol. percent (6.32 mol.) was benzaldehyde, about 9 mol. percent (0.89 mol.) was butyraldehyde and about 30 mol. percent (3.16 mol.) was acetaldehyde.

EXAMPLE 5.—*Polyvinyl acetaldehyde-butyraldehyde-benzaldehyde acetal resin*

917 g. (10.7 mol.) of polyvinyl acetate (of viscosity 25) were dissolved in 2.27 kg. of 95% ethyl alcohol. To this solution were added 335 g. (3.16 mol.) of benzaldehyde, 192 g. (2.66 mol.) of butyraldehyde, 186 g. (4.23 mol.) of paraldehyde and 227 g. of hydrochloric acid (sp. g. 1.18). The resulting mixture was treated and the resin isolated as in Example 2. The resin contained an acetate group content equivalent to about 2.2 percent by weight of polyvinyl acetate and a hydroxyl group content equivalent to about 10.0% by weight of polyvinyl alcohol. Of the total aldehydes employed (10.05 mol.), about 31 mole percent (3.16 mol.) was benzaldehyde, about 26.5 mol. percent (2.66 mol.) was butyraldehyde and about 42.5 mol. percent (4.23 mol.) was acetaldehyde.

EXAMPLE 6.—*Polyvinyl formaldehyde-butyraldehyde-benzaldehyde acetal resin*

50 g. (0.58 mol.) of polyvinyl acetate (of viscosity 25) were dissolved in 125 g. of 95% ethyl alcohol. To this solution were added 30.8 g. (0.29 mol.) of benzaldehyde, 18.7 g. (0.26 mol.) of butyraldehyde, 0.875 g. (0.03 mol.) of paraformaldehyde and 12.5 g. of hydrochloric acid (sp. g. 1.18). The resulting mixture was allowed to stand, at about 40° C., for about 5 days. The reaction mixture set to a gel. The gel was dissolved in about 5½ times its volume of acetic acid and the solution was poured into cold water to precipitate the resin. The precipitated resin was thoroughly washed with water (for about 24 hours) and finally dried at 140° to 160° F. The resin contained an acetate group content equivalent to about 5.5% by weight of polyvinyl acetate and a hydroxyl group content equivalent to about 12.5% by weight of polyvinyl alcohol. Of the total aldehydes employed (0.58 mol.), about 50 mol. percent (0.29 mol.) was benzaldehyde, about 45 mol. percent (0.26 mol.) was butyraldehyde and about 5 mol. percent (0.03 mol.) was formaldehyde.

EXAMPLE 7.—*Polyvinyl formaldehyde-heptaldehyde-chlorobenzaldehyde acetal resin*

50 g. (0.58 mol.) of polyvinyl acetate (of viscosity 25) were dissolved in 125 g. of 95% ethyl alcohol. To this solution were added 49.0 g. (0.36 mol.) of o-chlorobenzaldehyde, 19.8 g. (0.17 mol.) of heptaldehyde, 1.75 g. (0.06 mol.) of paraformaldehyde and 12.5 g. of hydrochloric acid (sp. g. 1.18). The resulting mixture was allowed to stand, at about 40° C., for about 5 days. The mixture set to a gel which was dissolved, and the resin isolated as in Example 6. The resin contained an acetate group content equivalent to about 9.4% by weight of polyvinyl acetate and a hydroxyl group content equivalent to about 3.8% by weight of polyvinyl alcohol. Of the total aldehydes employed (0.59 mol.), about 60 mol. percent (0.36 mol.) was o-chlorobenzaldehyde, about 30 mol. percent (0.17 mol.) was butyraldehyde and about 10 mol. percent (0.06 mol.) was formaldehyde.

EXAMPLE 8.—*Polyvinyl formaldehyde-propionaldehyde-nitrobenzaldehyde acetal resin*

50 g. (0.58 mol.) of polyvinyl acetate (of viscosity 25) were dissolved in 125 g. of 95% ethyl alcohol. To this solution were added 8.8 g. (0.06 mol.) of m-nitrobenzaldehyde, 21.9 g. (0.38 mol.) of propionaldehyde, 4.38 g. (0.14 mol.) of paraformaldehyde and 12.5 g. of hydrochloric acid (sp. g. 1.18). The resulting mixture was allowed to stand, at about 40° C., for about 5 days. The mixture set to a gel which was dissolved and the resin isolated as in Example 6. The resin contained an acetate group content equivalent to about 3.4% by weight of polyvinyl acetate and a hydroxyl group content equivalent to about 8.3% by weight of polyvinyl alcohol. Of the total aldehydes employed (0.58 mol.), about 10 mol. percent (0.06 mol.) was m-nitrobenzaldehyde, about 65 mol. percent (0.38 mol.) was propionaldehyde and about 25 mol. per cent (0.14 mol.) was formaldehyde.

EXAMPLE 9.—*Polyvinyl acetaldehyde-heptaldehyde-nitrobenzaldehyde acetal resin*

50 g. (0.58 mol.) of polyvinyl acetate (of viscosity 25) were dissolved in 125 g. of 95% ethyl alcohol. To this solution were added 35.0 g. (0.23 mol.) of m-nitrobenzaldehyde, 5 g. (0.04 mol. of heptaldehyde, 14 g. (0.32 mol.) of paraldehyde and 12.5 g. of hydrochloric acid (sp. g. 1.18). The resulting mixture was allowed to stand, at about 40° C., for about 5 days. The mixture set to a gel. The gel was dissolved and the resin isolated as in Example 6. The resin contained an acetate group content equivalent to about 2.8% by weight of polyvinyl acetate and a hydroxyl group content equivalent to about 6.1% by weight of polyvinyl alcohol. Of the total aldehydes employed (0.59 mol.), about 40 mol. percent (0.23 mol.) was m-nitrobenzaldehyde, about 5 mol. percent (0.04 mol.) was heptaldehyde and about 55 mol. percent (0.32 mol.) was acetaldehyde.

EXAMPLE 10.—*Polyvinyl acetaldehyde-propionaldehyde-chlorobenzaldehyde acetal resin*

50 g. (0.58 mol.) of polyvinyl acetate (of viscosity 25) were dissolved in 125 g. of 95% ethyl alcohol. To this solution were added 4.1 g. (0.03 mol.) of o-chlorobenzaldehyde, 6.7 g. (0.12 mol.) of propionaldehyde, 19.1 g. (0.43 mol.) of paraldehyde and 12.5 g. of hydrochloric acid (sp. g. 1.18). The resulting mixture was allowed to stand, at about 40° C., for about five days. The reaction mixture was then diluted with about 5 times its volume of acetic acid. The diluted reaction mixture was poured into water to precipitate the resin. The resin was washed and dried as in Example 6. The resin contained an acetate group content equivalent to about 1.7% by weight of polyvinyl acetate and a hydroxyl group content equivalent to about 7.9% by weight of polyvinyl alcohol. Of the total aldehydes (0.58 mol.), about 5 mol. percent (0.03 mol.) was o-chlorobenzaldehyde, about 20 mol. percent (0.12 mol.) was propionaldehyde and about 75 mol. percent was acetaldehyde.

Heat accelerates the formation of my new resins, but temperatures over 70° C. are advantageously avoided. A temperature range of from about 20° to 50° C. is preferable.

As acid deesterification catalysts, mineral acids are advantageously employed. Hydrochloric acid is most advantageously employed, since the resins obtained when it is employed are ordinarily more stable than those obtained when sulfuric acid is employed, for example. Trichloracetic acid or organic sulfonic acids can be used.

As acetal condensation catalysts, acids, particularly mineral acids, are likewise advantageously employed. When preparing my new resins by concomitantly deesterifying a polyvinyl ester and condensing the deesterification product with aldehydes, the acid catalyst accelerates both deesterification and condensation. Hydrochloric acid and sulfuric acid are especially useful. As catalysts which promote acetal condensations but which are less useful as deesterification catalysts, zinc chloride and phosphoric acid may be mentioned.

The resins are advantageously prepared in a solution from which they can be precipitated by diluting the solution with water (e. g. by pouring the solution into water), as illustrated in the above examples. The solvents are employed in conjunction with water and are advantageously water-miscible solvents, such as methyl, ethyl or isopropyl alcohols, acetic or propionic acids or 1,4-dioxane, for example. Where the reaction mixture forms a gel during the preparation of the resin, it is advantageous to dissolve the gel in a solvent, such as one of the aforesaid, and then pour the resulting solution into water to precipitate the resin, as illustrated in the above examples.

The aldehydes can be employed in their monomeric or polymeric forms, or in the form of a derivative which yields the aldehyde in the reaction mixture, such as the diethyl acetal of acetaldehyde, for example.

Any polyvinyl ester can be employed in preparing my new resin; for example, polyvinyl acetate, polyvinyl chloracetate, or polyvinyl propionate. Polyvinyl acetate is especially satisfactory. The viscosity of the polyvinyl ester employed may vary widely. In the above examples the viscosities of the polyvinyl esters are stated as viscosities, in centipoises of their molar solutions (86.05 grams per liter in the case of polyvinyl acetate), in benzene at about 20° C.

To prepare film or sheet from my new resins, I first dissolve about one part of the resin in from three to four parts of a suitable solvent, such as a mixture of 90% (by volume) ethylene dichloride and 10% methyl alcohol, a mixture of 90% (by volume) benzene and 10% methyl alcohol, or a mixture of 90% (by volume) toluene and 10% methyl alcohol. If necessary, larger amounts of solvent may be employed. Such a solution is then cast onto a film-forming surface, such as a metal or glass plate, or a revolving drum to desired thickness and the resulting film or sheet is then allowed to dry. Drying may be facilitated by blowing warm air over the drying film or sheet. When sufficiently dry, the film or sheet is stripped from the film-forming surface and "cured" by treating with warm air. The "curing" removes the residual solvent, giving a transparent film or sheet of low moisture susceptibility, fairly low thermoplasticity and good tensile strength, particularly when made from a resin such as described in Example 4. The resulting film or sheet can be coated directly with photographic emulsions or can be coated first with resinous or other known "subbing" materials before the photographic emulsion is applied.

My new resins can be pressed into blocks and skived to thin sheets or layers which can be used as a laminating material, e. g. between sheets of glass, particularly if suitably plasticized. My new resins are compatible with a number of plasticizers, such as tributyl phosphate, triphenyl phosphate, tricresyl phosphate, diamyl phthalate, dibutyl phthalate, di- and triglycerol esters, such as acetates, propionates, butyrates, caproates and the like, monochlornaphthalene or the like. My new resins can be successfully molded or extruded when suitably plasticized.

What I claim as my invention and desire to be secured by Letters Patent of the United States is:

1. A process for preparing a polyvinyl acetal resin containing a hydroxyl group content equivalent to not more than about 15% by weight of polyvinyl alcohol and an acetate group content equivalent to not more than about 5% by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 30 to about 60 mol. per cent of said aldehydes being acetaldehyde, from about 9 to about 15 mol. percent of said aldehydes being at least one saturated aliphatic aldehyde containing from three to seven carbon atoms and the remainder of said aldehydes being at least one benzaldehyde.

2. A process for preparing a polyvinyl acetal resin containing a hydroxyl group content equivalent to not more than about 15% by weight of polyvinyl alcohol and an acetate group content equivalent to not more than about 5% by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 30 to about 60 mol. percent of said aldehydes being acetaldehyde, from about 9 to about 15 mol. percent of said aldehydes being butyraldehyde and the remainder of said aldehydes being at least one benzaldehyde.

3. A process for preparing a polyvinyl acetal resin containing a hydroxyl group content equivalent to not more than about 15% by weight of polyvinyl alcohol and an acetate group content equivalent to not more than about 5% by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, from about 30 to about 60 mol. per cent of said aldehydes being acetaldehyde, from about 9 to about 15 mol. percent of said aldehydes being butyraldehyde and the remainder of said aldehydes being ordinary benzaldehyde of the formula: $C_6H_5CHO$.

4. A process for preparing a polyvinyl acetal resin containing a hydroxyl group content equivalent to not more than about 15% by weight of polyvinyl alcohol and an acetate group content equivalent to not more than about 5% by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, about 30 mol. percent of said aldehydes being acetaldehyde, about 10 mol. percent of said aldehydes being butyraldehyde and the remainder of said aldehydes being ordinary benzaldehyde having the formula: $C_6H_5CHO$.

5. A process for preparing a polyvinyl acetal resin containing a hydroxyl group content equivalent to not more than about 15% by weight of polyvinyl alcohol and an acetate group content equivalent to not more than about 5% by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, about 55 mol. percent of said aldehydes being acetaldehyde, about 5 mol. percent of said aldehydes being heptaldehyde and the remainder of said aldehydes being m-nitrobenzaldehyde.

6. A process for preparing a polyvinyl acetal resin containing a hydroxyl group content equivalent to not more than about 15% by weight of polyvinyl alcohol and an acetate group content equivalent to not more than about 5% by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, about 45 mol. percent of said aldehydes being acetaldehyde, about 10 mol. percent of said aldehydes being butyraldehyde and the remainder of said aldehydes being ordinary benzaldehyde having the formula: $C_6H_5CHO$.

GUSTAVE BRYANT BACHMAN.